(12) United States Patent
Bialkowski et al.

(10) Patent No.: US 8,363,718 B2
(45) Date of Patent: Jan. 29, 2013

(54) METHOD FOR CORRECTING A QUANTIZED DATA VALUE AND ASSOCIATED DEVICE

(75) Inventors: Jens-Günter Bialkowski, Nürnberg (DE); Andrë Kaup, Effeltrich (DE)

(73) Assignee: Siemens Aktiengesellschaft, Munich (DE)

( * ) Notice: Subject to any disclaimer, the term of this patent is extended or adjusted under 35 U.S.C. 154(b) by 778 days.

(21) Appl. No.: 11/990,343

(22) PCT Filed: Jul. 11, 2006

(86) PCT No.: PCT/EP2006/064094
§ 371 (c)(1),
(2), (4) Date: Sep. 14, 2009

(87) PCT Pub. No.: WO2007/054382

PCT Pub. Date: May 18, 2007

(65) Prior Publication Data
US 2010/0008594 A1    Jan. 14, 2010

(30) Foreign Application Priority Data
Aug. 12, 2005   (DE) .......................... 10 2005 038 295

(51) Int. Cl.
*H04N 7/12* (2006.01)
(52) U.S. Cl. .............. 375/240.03; 375/240.02; 382/251; 382/252
(58) Field of Classification Search .................. None
See application file for complete search history.

(56) References Cited

U.S. PATENT DOCUMENTS

| | | | |
|---|---|---|---|
| 6,208,688 B1 | 3/2001 | Seo et al. | |
| 6,987,808 B2 * | 1/2006 | Mine | 375/240.03 |
| 7,477,688 B1 * | 1/2009 | Zhang et al. | 375/240 |
| 2005/0084157 A1 * | 4/2005 | Shen | 382/232 |

OTHER PUBLICATIONS

S. Kadono et al., "Optimization of Requantization Parameter for MPEG Transcoding"; Systems and Computers in Japan, vol. 33, No. 9, 2002; pp. 21-30.
G. Keesman et al., "Transcoding of MPEG bitstreams"; Signal Processing: Image Communication, vol. 8, No. 6, 1996; pp. 481-500.
J. Bialkowski et al., "A Fast H.263 to H.264 Inter-frame Transcoder with Motion Vector Refinement"; Picture Coding Symposium (PCS), San Francisco, Dec. 2004, 6 pp.
H. Sorial et al.; "Selective Requantization for Transcoding of MPEG Compressed Video"; IEEE International Conference on Multimedia and Expo (ICME 2000), Jul. 2000, pp. 217-220.

(Continued)

*Primary Examiner* — Donald Mills
(74) *Attorney, Agent, or Firm* — Staas & Halsey LLP

(57) ABSTRACT

Where a quantized data value is produced by a first quantization of an input data value, followed by a first inverse quantization and subsequently by a second quantization and the first quantization has first quantization intervals and the second quantization has second quantization intervals, third quantization intervals are generated by displacing interval boundaries of the second quantization intervals, respectively, to the next interval boundaries of the first quantization intervals. A third reconstruction value is determined for the third quantization intervals such that the third reconstruction value lies within the associated third quantization intervals. A corrected data value is generated by a third inverse quantization of the quantized data value and the third inverse quantization is affirmed by the third quantization intervals containing the associated third reconstruction value.

12 Claims, 6 Drawing Sheets

OTHER PUBLICATIONS

A. Vetro et al.; Video Transcoding Architectures and Techniques: An Overview; IEEE Signal Processing Magazine, vol. 20, No. 2, Mar. 2003; pp. 18-29.

J. Bialkowski et al.; "Fast Transcoding of Intra Frames Between H.263 and H.264", 2004 International Conference on Image Processing, vol. 4, Oct. 2004; pp. 2785-2788.

O. Werner, "Generic Quantiser for Transcoding of Hybrid Video"; Proc. Pict. Cod. Symp. (PCS), 1997, Berlin, pp. 1-6.

O. Werner, "Requantization for Transcoding of MPEG-2 Intraframes"; IEEE Transaction of Image Proc., vol. 8, No. 2, Feb. 1999, pp. 179-191.

WN Lie et al., "Rate-Distortion Optimized DCT-Domain Video Transcoder for Bit-Rate Reduction of MPEG Videos", Proceedings of IEEE Conference on Acoustics, Speech, and Signal Processing, May 2004, vol. 5, pp. 969-972.

J. Bialkowski et al.; "On Requantization in Intra-Frames Video Transcoding with Different Transform Block Sizes", IEEE 7th Workshop on Multimedia Signal Processing, Oct. 2005, pp. 1-4.

J. Bialkowski et al.; "Overview of Low-Complexity Video Transcoding from H.263 to H.264"; Proceedings of IEEE International Conference on Multimedia and Expo (ICME 2006), Jul. 2006, pp. 49-52.

P. Assunção et al., "Optimal Transcoding of Compressed Video", IEEE Proc. Int. Conf. Imag. Proc. (ICIP), 1997, vol. 1., pp. 739-742.

International Search Report for International Application No. PCT/EP2006/064094; mailed Feb. 26, 2007.

* cited by examiner

--□-- One quantization
--○-- Two quantizations
—*— Variant 1
—×— Variant 2

--□--  One quantization
--○--  Two quantizations
—*—   Variant 1
—×—   Variant 3

METHOD FOR CORRECTING A QUANTIZED DATA VALUE AND ASSOCIATED DEVICE

CROSS REFERENCE TO RELATED APPLICATIONS

This application is based on and hereby claims priority to German Application No. 10 2005 038 295.9 filed on Aug. 12, 2005, the contents of which are hereby incorporated by reference.

BACKGROUND

During transcoding of quantized digital signals, such as a video signal, for example, a digital input signal is converted into a new digital output signal. A method for transcoding can be used to adapt the input signal for different transmission requirements and/or various terminal device functionalities. In so doing, the adaptation of a data rate of the input signal can be carried out by new quantization. More complex transcoding methods modify further parameters, such as a refresh rate or a screen resolution in cases of transcoding a video signal.

With the aid of FIG. 1, a coding chain with transcoding of digital signals is described in more detail. An uncoded image signal features a plurality of brightness and color values which are edited in the spectral range, for example. These uncoded values are labeled as uncoded data values X0.

An uncoded data value X0, i.e. an input data value X0, is coded in a first coder C1 to a first intermediate data value X1. The coding takes place with the aid of a first quantization Q1. The first intermediate data value X1 is decoded into the second intermediate data value X2 using the first decoder D1. In this connection, a first inverse quantization IQ1 is carried out. The second intermediate data value X2 corresponds to the uncoded data value X0 apart from a quantization error. This second intermediate data value X2 is coded into a third intermediate data value X3 with the aid of a second coder C2. The second coder C2 uses a second quantizer C2 for coding. Subsequently, the third intermediate data value X3 is decoded into a final data value X4 using a second decoder D2. The decoding takes place in the second decoder D2 by the application of a second inverse quantization IQ2. The final data value X4 corresponds to the uncoded data value X0 apart from a quantization error, whereby this quantization error is caused both by the first quantization Q1 or first inverse quantization IQ1 and by the second quantization Q2 or second inverse quantization IQ2.

If, for example, a video distribution service is observed, then for a plurality of video images, having a plurality of uncoded data values X0, a plurality of first intermediate data values X1 are generated with the aid of the first coder. These first intermediate data values X1 are, for example, filed on a hard disk for later organized transmission to a terminal device. In order to transfer the video images to a terminal device in the suitable form, e.g. with a low data rate, the first intermediate data values X1 can be decoded into the second intermediate data values X2 with the aid of the first decoder. Subsequently, the second intermediate data values X2 are coded into the third intermediate data values X3 using the second coder, and can subsequently be transmitted to the desired terminal device in this form. The terminal device receives the third intermediate data values X3, decodes these with the aid of the second decoder D2 and displays the decoded end data values X4 on a screen, for example. In FIG. 1 a transcoding device TR is described with the aid of the first decoder and the second coder which transcoding device, for example, conducts a reduction of the data rate in the form of a code conversion of the first intermediate data values X1 (=input signal) into the third intermediate data value X3 (=output signal).

Digital signals, such as digital video signals, are coded or compressed for transfer with the aid of known coding standards, for example MPEG4 (MPEG—Motion Picture Expert Group) or H.264. These coding standards or video coding methods break the video signal down into blocks and introduce a motion compensation for predictive coding. The individual blocks are thereby broken down into spectral components by a mathematical map. For better compression the spectral components are quantized, such that components are removed from the signal which are not or only insignificantly recognizable for an observer. These removed components are also no longer accessible or reproducible within the transcoder.

The removal of signal components leads to additional quantization losses or quantization errors arising through a high quantizer level while carrying out an additional new quantization within the transcoder with the aid of the second quantization Q2. This means that, through the use of the first and second quantization, higher quantization errors arise than with the use of an individual quantizer. A loss in quality arising through the transcoding due to the new quantization leads to a visible deterioration of the image quality.

In FIG. 2, an image quality in PSNR (PSNR—Peak Signal to Noise Ratio) can be seen in exemplary form from the quantization level using one and two quantizations when used in a video coding method. The quantization level indicates a number of amplitudes of data values which are summarized within a quantization interval to a reconstruction value. For example, with a quantization level of 15 the amplitudes from 0 to 14 or from 15 to 29 etc. are each summarized to a reconstruction value, e.g. 7, 23 etc. The larger the quantization level, the stronger the compression by the quantization. The curve marked with squares is a first reference curve R1 and describes the image quality when using an individual quantizer, whereby quantization is performed with the quantization level indicated in FIG. 1. A second reference curve R2, marked with circles, shows the image quality with the use of two quantization levels according to FIG. 1 connected to each other in series, whereby quantization takes place in the first quantization Q1 with a first quantization level of 12 and in the second quantization Q2 with the quantization level indicated in FIG. 2, e.g. 20. It can thereby clearly be seen that the second reference curve lies underneath the first reference curve. So the difference in image quality PSNR at a quantization level of 20 is around 2 dB (dB—decibels). This means that with the use of more than one quantization the image quality is significantly reduced as compared to that with the use of an individual quantization.

Today, known video transcoders typically consist of the series connection of a decoder and a coder. A good overview can be gained from A. Vetro et al., "Video Transcoding Architectures and Techniques: An Overview", IEEE Sig. Proc. Mag., March 2003, pp. 18-29. The decoder decodes the input signal either completely or up to a specific level, such that at least the amplitudes of the spectral coefficients from the quantized values are calculated in order to be able subsequently to conduct a new quantization. For the sake of a reduction in complexity, both these decoded data values and peripheral information, like for example prediction modes and/or motion vectors, can be assigned to the second coder. In the second coder the rate adaptation by new quantization can be conducted with a higher quantization level than in the first quantization Q1. In O. H. Werner, "Generic Quantiser for Transcoding Hybrid Video", Proc. Pict. Cod. Symp. (PCS), 1997, a method is presented which adjusts the quantization in terms of the coefficients of the input data values and the additionally developed drift. Methods are known from P. A. Assuncao et al., "Optimal Transcoding of Compressed Video", IEEE Proc. Int. Conf. Image Proc. (ICIP), Vol. 1., 1997, pp. 739-742, and W.-N. Lie et al., "Rate-Distortion Optimized DCT-Domain Video Transcoder for Bit-Rate Reduction of MPEG Video; IEEE, Proc. Int. Conf. Aud. Sp. and Sig. Proc. (ICASSP), Vol. V., 2004, pp. 969-972, which use a Lagrange approach, in which the quantization is chosen in such a way that the distortion is minimal in terms of a predetermined rate, for the adjustment of the new quantization. We will, however, not go into the choice of a new reconstruction value in this connection.

SUMMARY

An aspect is to specify a method and a device which in a simple fashion reduces a quantization error during a transcoding with two quantizers, in particular within the scope of an image coding.

Described below is a method for correcting a quantized data value, whereby the quantized data value is generated by a first quantization of an input data value, followed by a first inverse quantization and subsequently by a second quantization; and a first quantization features first quantization intervals and the second quantization second quantization intervals, in which third quantization intervals are generated by displacement of each of the interval boundaries of the second quantization intervals to the nearest-located interval boundaries of the first quantization intervals; in which for each of the third quantization intervals a third reconstruction value is established in such a way that the third reconstruction value is located within the associated third quantization interval; in which a corrected data value is generated by a third inverse quantization of the quantized data value, whereby the third inverse quantization is formed by the third quantization intervals with the third associated reconstruction value.

A reduction in quantization error is achieved by the method, whereby the determination of the third quantization interval and of the third reconstruction values can be carried out with a low computational effort.

Furthermore, the method can be put to use for intervals of the first and/or second (inverse) quantization of the same or different sizes.

In addition, the method can be used within the scope of a decoding in a terminal device and/or in a transcoding unit.

If the third reconstruction value of the third quantization interval is preferably generated from at least one of those first reconstruction values of each of the first quantization intervals which are located within the observed third quantization interval, then the third reconstruction value can be determined simply.

If the third reconstruction value in an alternative embodiment is generated from two neighboring first reconstruction values by a weighted mean value, then individual properties of each of the first reconstruction values, such as a frequency distribution of the emergence of the first reconstruction values, can be considered for the generation of the third reconstruction value.

Preferably, the third reconstruction value is generated in such a way that the third reconstruction value is located in the middle of the associated third quantization interval. Hence the third reconstruction value can be determined in an especially simple way and with a very low degree of complexity.

In one extension, the third reconstruction value of the third quantization interval is generated in such a way that, on the basis of a relative frequency distribution of data values, in particular of data values according to the first inverse quantization, the most frequently occurring data value is reassigned to the third reconstruction value. In this way the quantization error is further reduced.

Preferably, that data value within the third quantization interval which, in the mean, produces the lowest quantization error under consideration of the relative frequency distribution of data values, is reassigned to the third reconstruction value of the third quantization interval, so the quantization error is additionally reduced and hence the image quality is visibly improved.

If the third inverse quantization is carried out in such a way that an intermediate value is generated by the second inverse quantization of the quantized data value, and this generated intermediate value is replaced by that third reconstruction value lying in the same third quantization interval as the generated intermediate value, then the method described herein can be simply integrated into an existing method. This is because the allocation of the third reconstruction values takes place after the second inverse quantization, through which merely a conversion of the second reconstruction values into the third reconstruction values is required. A replacement of existing components of the existing method, such as the second quantization, is thereby not required.

The method for correcting within the scope of a decoding method, especially an image coding method, is preferably adopted on those quantized data values which remain unconsidered for handling other quantized data values. Through this, a faultless decoding, e.g. in a terminal device, is made possible and at the same time a reduction of the quantization error and hence an improvement of the image quality is achieved.

In an alternative extension, the method for correcting preferably within the scope of a decoding method, in particular an image coding method, is only applied to the quantized data values after the latter remain unconsidered for the handling of other quantized data values. For this reason the method described herein can also be adopted in decoding methods which conduct a predictive coding.

If the method for correction within the scope of a transcoding method is adopted preferably with a first decoder and a second coder in a feedback loop of the second coder, then the method described herein can also be used for a transcoder. Through this an improvement of the image quality comes about.

Furthermore, a device implementing the method described herein can be used for correcting a quantized data value generated by a first quantization of an input data value followed by a first inverse quantization and subsequently by a second quantization, and a first quantization features first quantization intervals and the second quantization second quantization intervals, from which first by shifting each of the interval boundaries of the second quantization intervals to the nearest-located interval boundaries of the first quantization intervals, third quantization intervals are generated. Second, for each of the third quantization intervals a third reconstruction value is established in such a way that the third reconstruction value is located within the associated third quantization interval. Third, a corrected data value is generated by a third inverse quantization of the quantized data value, whereby the third inverse quantization is built by the third quantization intervals with the associated third reconstruction vale. In addition, extensions and variants can be implemented and carried out.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
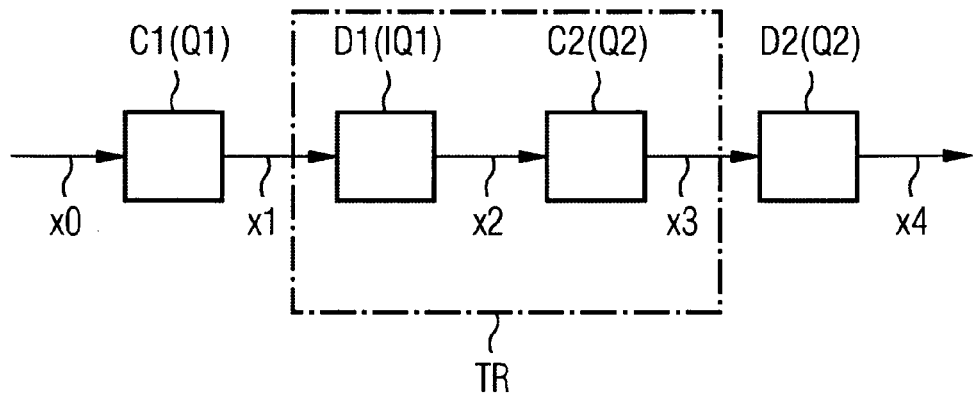
FIG. 1 is a block diagram of a device for generating an output data value from an input data value using two quantization levels.

Reference will now be made in detail to the preferred embodiments, examples of which are illustrated in the accompanying drawings, wherein like reference numerals refer to like elements throughout.

Elements with the same function and mode of operation are provided with the same reference numbers in the figures.

Figure 2:
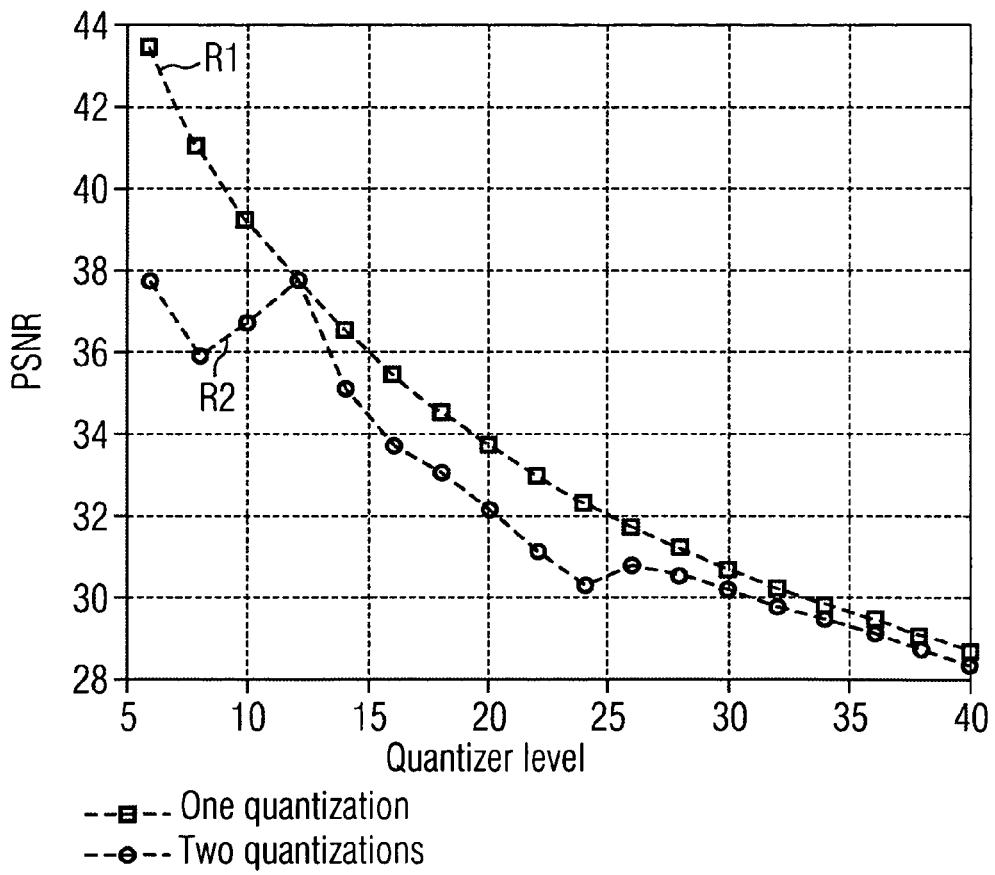
FIG. 2 is a graph for a comparison of the image quality between the use of a single and two quantization levels.

In a transcoding of digital signals, such as video signals or audio signals, a quality of an output signal or end data values $X4$ is substantially reduced by the use of two quantizers. This has already been illustrated in more depth in the introduction to the description with reference to FIGS. 1 and 2, and therefore this will not be examined in more detail below. In the following exemplary embodiment the method is described in greater depth by a video signal. The method or the device can be used not only for video signals, however, but also any kind of signals in which an inverse quantization and a new quantization downstream take place within the scope of a transcoding. This is prevalent in the coding of speech signals, music signals or fixed images, for example.

Figure 3:
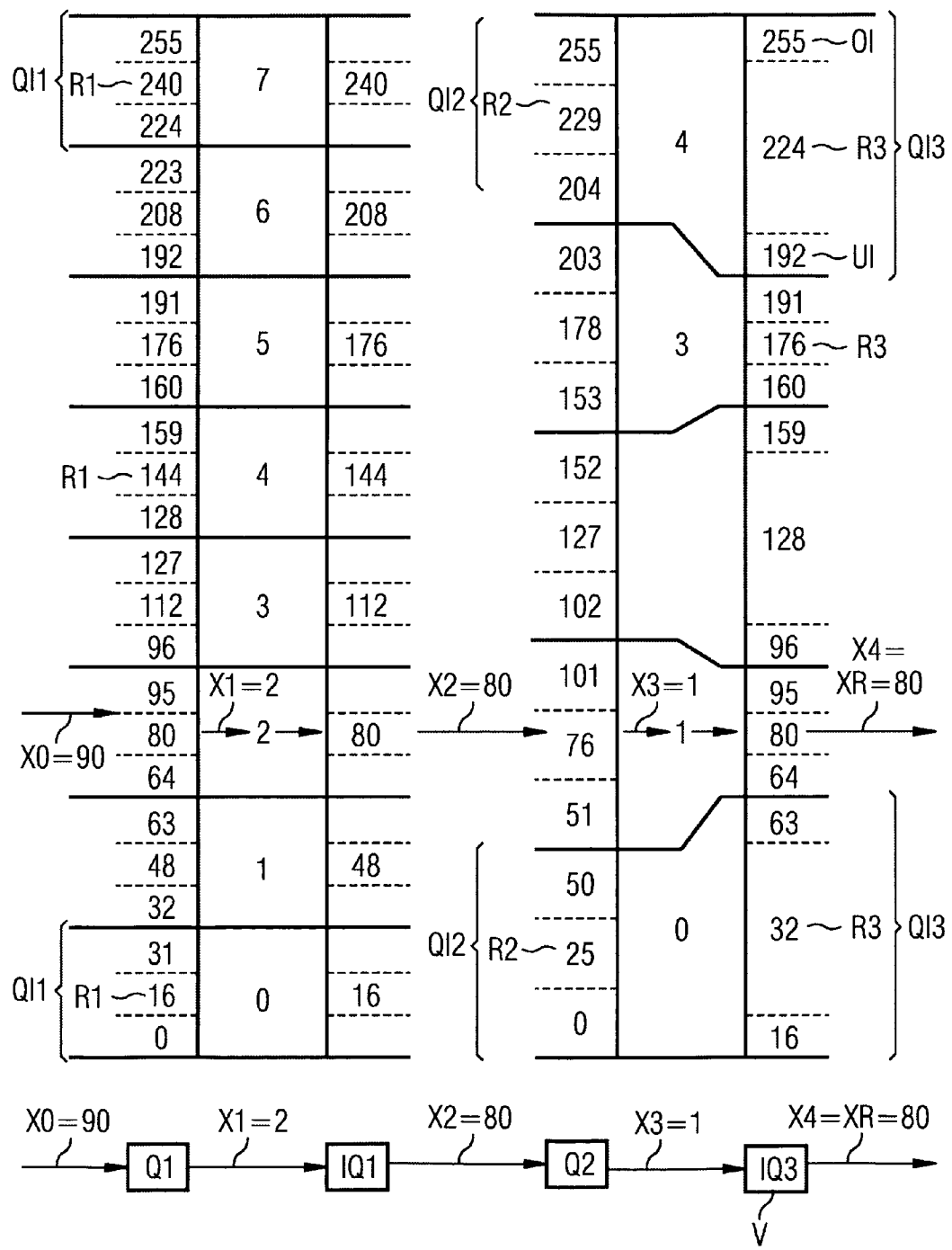
FIG. 3 is a data transmission diagram for an exemplary embodiment of the method described below.

FIG. 3 goes into greater detail regarding the method for a concrete numerical example. An uncoded data value $X0$, i.e. an input data value $X0$, is $X0=90$, for example. Within the scope of a first quantization $Q1$, a range of figures from 0 to 255 is separated out into eight first quantization intervals $QI1$ of equal size, i.e. a first quantization level of the first quantization comes to 32. In FIG. 3 a value is indicated on the lower and on the upper interval boundary for every first quantization interval $Q11$, as well as a first reconstruction value $R1$ corresponding to the respective first quantization interval. This is indicated analogously for the second and third quantization intervals $QI2$, $QI3$. This first reconstruction value $R1$, for example 144, is achieved if a quantized data value is transferred using a first inverse quantization $IQ1$ in the numerical range from 0 to 255. In the present example the uncoded data value $X0=90$ is quantized into the value 2, i.e. a first intermediate value $X1=2$. If the first inverse quantization $QI1$ is applied to the first intermediate data value $X1$, then a second intermediate data value $X2=80$ comes about, whereby this corresponds to the first reconstruction value $R1=80$ of the associated first quantization interval $QI1$.

The second intermediate data value $X2=80$ is subjected to a second quantization $Q2$. In this the range of values from 0 to 255 is divided up into five second quantization intervals $QI2$ of equal size, i.e. the quantization level of the second quantization comes to 51. Analogously to the first quantization $Q1$, a value is indicated in each case for the upper and lower interval boundary of every second quantization interval $QI2$ in addition to a second reconstruction value $R2$. The second intermediate data value $X2=80$ is quantized by the second quantization $Q2$ in a third intermediate data value $X3=1$. The third intermediate data value $X3$ is also labeled as quantized data value $X3$.

Subsequently, a corrected data value XR is formed from the third intermediate data value $X3$ using the method. The third intermediate data value $X3=1$ is thereby displayed on a third quantization interval $QI3$ with the interval boundaries 64 to 95, whereby because of a third inverse quantization $IQ3$ the third intermediate data value $X3$ is reassigned to the third reconstruction value $R3=80$. This third reconstruction value $R3=80$ corresponds to the corrected data value XR. In FIG. 3 the five third quantization intervals $QI3$ are displayed on the right hand side. Furthermore, for every one of the third quantization intervals $QI3$ an associated third reconstruction value $R3$, for example $R3=32$ or $R3=224$, can be seen.

For generating the third quantization intervals $QI3$, the interval boundaries of the second quantization intervals $QI2$ are shifted in such a way that each of them corresponds to the nearest-located interval boundaries of the first quantization intervals $QI1$. If the second quantization interval $QI2$ is observed from 204 to 255, for example, then the upper interval boundary of this second quantization interval $QI2$ corresponds to the interval boundary of one of the first quantization intervals $QI1$. The lower interval boundary 204, however, lies within the interval boundaries 192 to 223 of one of the first quantization intervals $QI1$. Hence this interval boundary 204 of the second quantization interval $QI2$ is displaced to the nearest-located interval boundary of the first quantization interval $QI1$ with the lower interval boundary 192. This mode of operation can be adopted for all second upper and lower interval boundaries, and to determine the interval boundaries of the third quantization intervals $QI3$.

In order to establish the third reconstruction value $R3$, a value can be selected from within the respective third quantization interval $QI1$. So the third reconstruction value $R3$ of the third quantization interval $QI3$ with the interval boundaries comes to 192 to 255 just like $R3=224$. In the present exemplary embodiment according to FIG. 3, the third reconstruction values of each of the third quantization intervals $QI3$ are laid out in the middle of each of the quantization intervals $QI3$, whereby through rounding up or down as appropriate only whole number values are allowed for the third reconstruction values $R3$.

In FIG. 3 the third intermediate values $X3$ are used e.g. as an index for choosing the third reconstruction values $R3$ from a first list. This list goes e.g.:

| X3 | 0 | 1 | 2 | 3 | 4 |
|---|---|---|---|---|---|
| R3 | 32 | 80 | 128 | 176 | 224 |

So for the third intermediate value X3=2 the third reconstruction value R3=128 is chosen.

In an alternative embodiment, after the second quantization Q2 the second inverse quantization IQ2 is initially carried out. The second reconstruction values R2 gained therefrom, i.e. the fourth intermediate values X4, can then serve as an index for a second list, in order to determine therefrom the third reconstruction values. This second list looks, for example, like:

| R2, X4 | 25 | 76 | 127 | 178 | 229 |
|---|---|---|---|---|---|
| R3 | 32 | 80 | 128 | 176 | 224 |

So for the second reconstruction value R2=229 the third reconstruction value R3=224 is selected. The mode of operation according to the first list has the advantage that an organized saving and editing of the first list is easier, as the index of the first list X3 is ascending linearly from 0 to 4.

The method is explained by way of example by equally large first and second quantization intervals. In general, the method described herein can also be adopted for first and/or second quantization intervals of differing sizes. Furthermore, the method can also be used for quantization intervals which instead of positive (data) values include negative and/or positive and negative (data) values.

Figure 4:
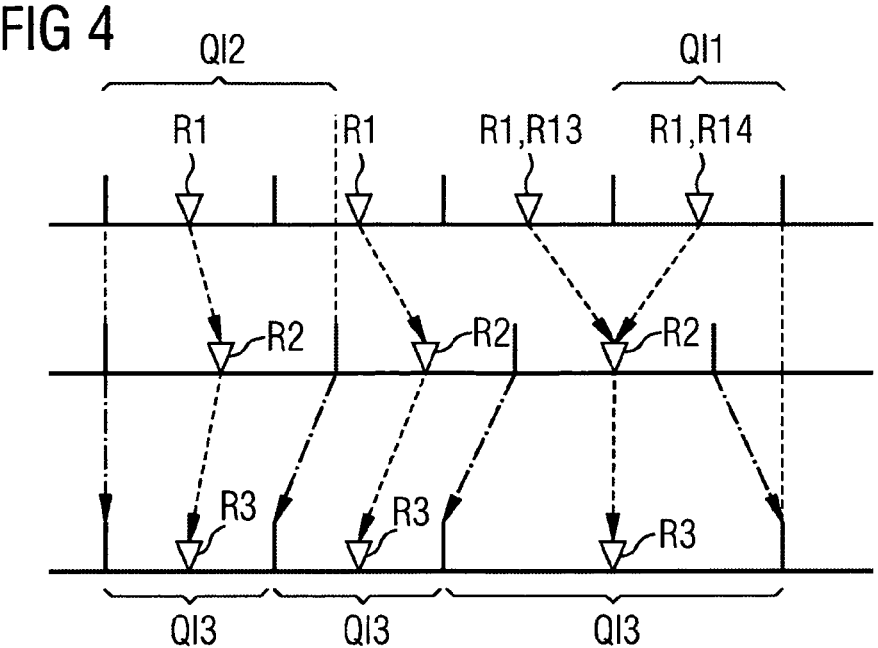
FIG. 4 is a data transmission diagram illustrating an assignment of third interval boundaries and third reconstruction values.

In FIG. 4 the method is displayed graphically in an alternative display format. In the first row there are displayed several first quantization intervals QI1 and the associated first reconstruction values R1. Underneath that there follows in the second row the second quantization intervals QI2 and the associated second reconstruction values R2, as well as in the third row the third quantization intervals QI3 and the associated third reconstruction values R3. After the inverse first quantization IQ1, the first reconstruction values R1 are each displayed on one of the second reconstruction values R2. Next to a bijective drawing from R1 to R2, two or more, especially neighboring, first reconstruction values R1 can also be displayed on an individual second reconstruction value R2.

For generating the third quantization intervals QI3, the interval boundaries of the second quantization intervals QI2 are shifted in such a way that they correspond to their neighboring interval boundaries of the first quantization Q1. Furthermore, the third reconstruction values R3 are generated in such a way, for example, that a value lying in the middle of the respective third quantization interval QI3 is selected. As is shown according to FIG. 4, a third reconstruction value R3 is thereby reassigned to each second reconstruction value R2. In addition to the use of equally large first or second quantization intervals QI1, QI2, the method or device is also applicable should the first quantization intervals QI1 and/or second quantization intervals QI2 be of different sizes. As can be seen from FIG. 4, for example, the second quantization intervals QI2 are not exactly the same length.

Figure 6:
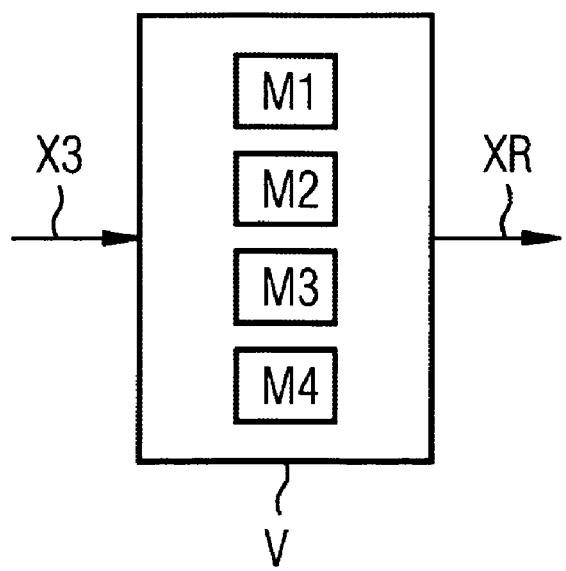
FIG. 6 is a block diagram of a device for carrying out the method.

In FIG. 6 a device for carrying out the method is depicted. The third intermediate data value X3, which is generated because of the first or second quantization, is conveyed to the device V. In the device V, third quantization intervals QI3 are generated with a first unit M1 by shifting the interval boundaries of each of the second quantization intervals QI2 to the nearest-located interval boundaries of the first quantization intervals QI1. Furthermore, with the aid of a second unit M2 for the third quantization intervals QI3, the respective third reconstruction values R3 are established in such a way that the third reconstruction value R3 is located within the associated third quantization interval QI3, for example in the middle of the respective third quantization interval QI3. Subsequently, through a third unit M3 of the device V, the corrected data value XR is generated by a third inverse quantization IQ3 of the third intermediate value, or rather of the quantized data value X3, whereby the third inverse quantization IQ3 is represented by the third quantization intervals QI3 with the associated third reconstruction values R3.

The processing carried out through the first and the second units M1, M2 are carried out only a single time at the initialization of the device V, for example. In contrast, further processing, carried out through the third unit M3, is adopted for every new quantized data value X3. The device V delivers on each output a corrected data value XR per quantized data value X3. With the aid of a fourth unit M4, extensions of the method can be implemented and carried out.

Figure 7:
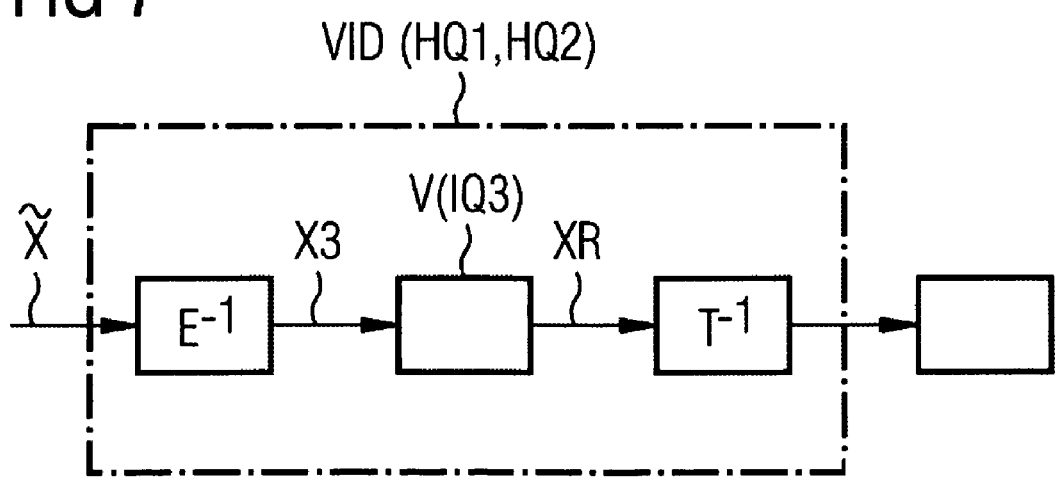
FIG. 7 is a block diagram illustrating use of the device within the scope of a fixed-image decoding method.

The device, or the method, be used within the scope of a fixed image decoding method VID. This is shown in FIG. 7. The coded data value $\tilde{X}$ is thereby subjected to an inverse entropy coding $E^{-1}$. From this the quantized data value X3 is generated, which represents e.g. a spectral coefficient. The device V carries out the method and generates the corrected data value XR, which is processed further within the scope of the fixed image decoding method VID, e.g. by an inverse transformation $T^{-1}$. The image reconstructed by the fixed image coding method VID can finally be returned to an image screen D. In the example envisaged according to FIG. 7, the quantized data value X3 corresponds to a spectral coefficient coded within an 8×8 image block, within an image coded e.g. according to JPEG standard (JPEG—Joint Picture Expert Group). The mode of operation according to FIG. 7 can also be usable in a video coding method, whereby only those quantized data values X3 which are not made on the basis of a prediction of other pixels or images are edited with the aid of the device or method described herein.

Figure 8:
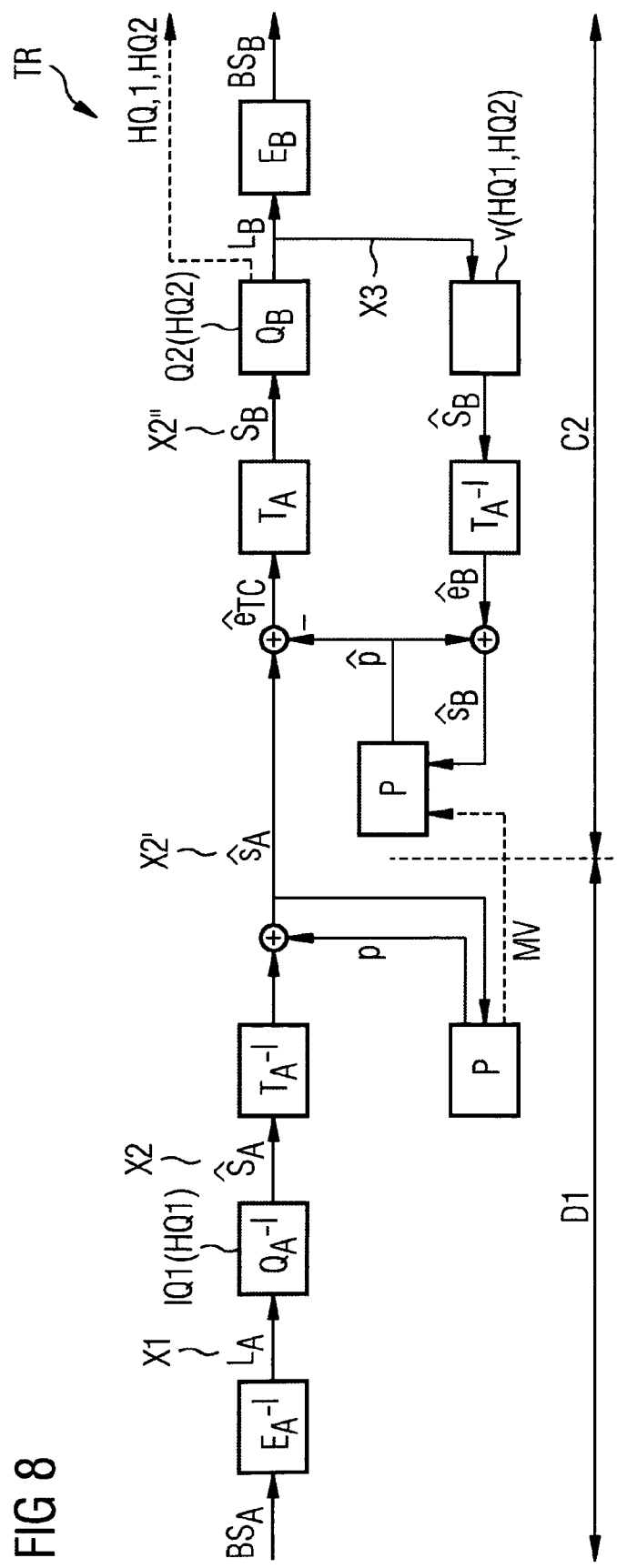
FIG. 8 is a block diagram illustrating use of the method described below within the scope of a transcoding device.

The introduction of the method or the device within the scope of a hybrid video transcoder is described in more detail with the aid of FIG. 8. The first intermediate data value X1, $L_A$ is calculated, with the aid of an inverse entropy coding $E_A^{-1}$, from an entropy-coded data value $BS_A$; and the second intermediate data value X2, $\hat{S}_A$ is calculated from the first intermediate data value X1 by the first inverse quantization IQ1, $Q_A^{-1}$, and the second intermediate value X2, $\hat{S}_A$ undergoes the inverse transformation $T_A^{-1}$. To the data value obtained from this is added a predictor P from one of the preceding images, through which a modified second intermediate value X2' is generated. This predictor P is 0 is cases of non-predicted (intra-) images. Additional to motion vectors MV, a piece of information about the first quantizer level HQ1 used in the first quantization Q1 is delivered to the coder B (not shown).

To generate the third intermediate data value X3, an arrangement of the second coder C2 according to FIG. 8 is used. An arrangement of this kind is known to someone skilled in the art, for example from the video coder standard H.263 or H.264. After an optional subtraction of a data value—calculated by a predictor from one of the previous images—from the modified second intermediate data value X2', this subtracted data value $\hat{e}_{TC}$ is coded with the aid of a transformation $T_A$ into a transformed second intermediate value X2'', $S_B$, this transformed second intermediate value X2'' is coded using the second quantization Q2, $Q_B$, into the quantized data value X3, $L_B$, and this is coded by an entropy coding $E_B$ to a coded end value $BS_B$. The second quantization Q2 has the second quantization level HQ2. As can be seen from FIG. 8, the method is carried out on an identical basis, e.g. on transformed data values. This means that the second data value X2 is inverse transformed and transformed again before the second quantization Q2. In order to achieve the identical data basis, the transformation $T_A$ and the inverse transformation $T_A^{-1}$ are inverse to one another.

In the feedback loop of the second coder, which grips the quantized data value X3, $L_B$ after the second quantization Q2, the device V is introduced instead of the inverse second quantization otherwise conventional in the standard H.263. This, under consideration of the first and second quantizer levels HQ1, HQ2, generates an inverse quantized value $\hat{S}_B$, which is introduced for the further coding, e.g. the inverse transformation $T_A^{-1}$.

In this exemplary embodiment according to FIG. 8, the device or rather the method is used in the feedback loop. In order to ensure that the second decoder D2, e.g. integrated in a terminal device (not shown), can accomplish an error-free decoding of the quantized data values X3, the quantizer levels HQ1, HQ2 of the first and second quantization Q1, Q2 are transmitted e.g. to the second decoder D2.

Figure 5:
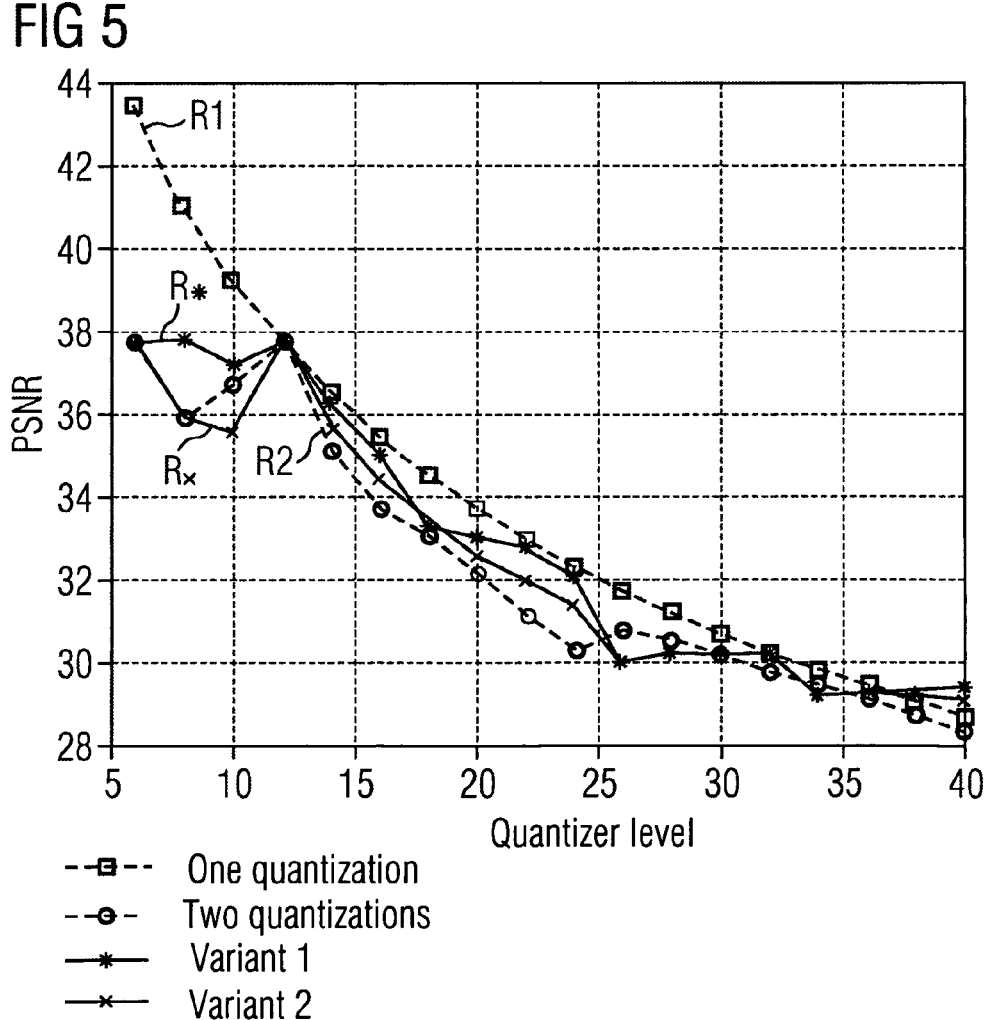
FIG. 5 is a graph for a comparison of an image quality in the use of a single quantization level, two quantization levels and two quantization levels, taking into consideration the method described below.

With the aid of FIG. 5, the improvement achieved in the image quality will be explained in more detail using the method. FIG. 5 shows, as has already been explained in more detail in FIG. 2, the first and second reference curves R1, R2. The curves XR, R* labeled "x" and "*" represent the image quality when using the method. If the method is merely adopted on one decoder (variant 2), as is explained for example with the aid of FIG. 7, then the second curve XR marked "x" is generated. This variant 2 shows a clear improvement as compared with the second reference curve R2. If the method is additionally carried out in a transcoder unit, as for example is explained in more detail with the aid of FIG. 8 (variant 1), then a further quality improvement can be achieved. This can be seen in FIG. 5 by the "*"s in the first curve R*.

In an extension to the method, the third reconstruction value R3 of the third quantization interval QI3 can be generated from at least one of those first reconstruction values R1 of the respective first quantization intervals which are located within the observed third quantization interval QI3. Reference is made to FIG. 4 for explanation in greater detail. If the first and third quantization intervals QI1, QI3 on the left side of FIG. 4 are observed, the respective interval boundary of the first and third quantization interval QI1, QI33 is identical. In order to determine the third reconstruction value R3 of this third quantization interval QI3, the third reconstruction value R3 can e.g. be chosen identically to the first reconstruction value R1.

On the other hand, the right hand third quantization interval QI3 in FIG. 4 includes two first quantization intervals QI1. In order to determine a third reconstruction value R3 for this third quantization interval QI3, either one of the two first reconstruction values R13, R14 of the two right quantization intervals QI1 can be selected. In an alternative embodiment to this, the third reconstruction value R3 can be generated from a combination of the first two reconstruction values R13, R14. For example, the third reconstruction value R3 is calculated through a weighted mean. Formally, this looks like e.g.:

$$R3 = 0.5*(R13+R14) = 0.5*(240+208) = 224$$

The values for R13=208 and R14=240 were taken from FIG. 3. As can also be taken from FIG. 3, R3=224 is generated. Instead of determining a mean, each of the first reconstruction values R1 can be charged with an individual factor, and by addition of the weighted first reconstruction values R13, R14 the third reconstruction value R3 is determined.

In an alternative extension of the method, the third reconstruction values of every third quantization interval are generated in such a way that the third reconstruction value R3 corresponds to a value with a highest probability of appearing within the associated third quantization interval QI3.

Figure 9:
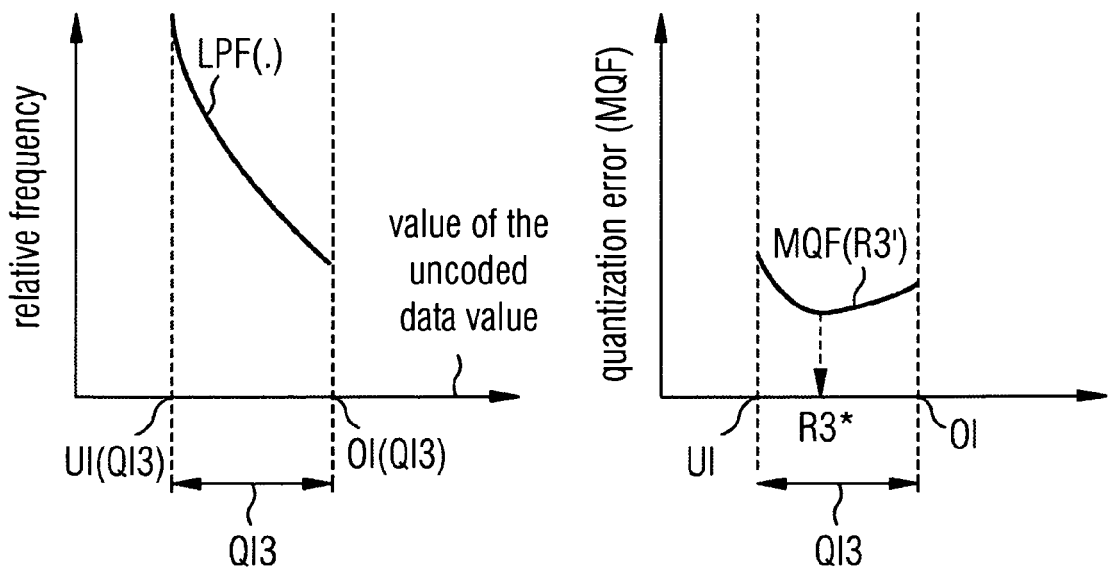
FIG. 9 are graphs for determination of the third reconstruction value, taking into consideration the relative frequency of data values for minimizing a quantization error.

Moreover, the third reconstruction value R3, as is shown in greater detail with reference to FIG. 9, can be calculated on the basis of a relative frequency of appearance of a value of a data value, for example of the uncoded data value X0, and of the quantization error associated with the respective value. In the left half of FIG. 9 there is a relative frequency LPF(.) for the appearance of a value of an uncoded data value for a selected third quantization interval QI3. If a mean quantization error MQF for the selected third quantization interval QI3 is calculated, then the third reconstruction value R3* can be placed in the position within the third quantization interval QI3 which generates the smallest mean quantization error MQF. The mean quantization error MQF for every possible value R3' of a data value within the observed third quantization interval QI3 is calculated e.g. by the following equation:

$$MQF(R3') = \int_{i=UI(QI3)}^{OI(QI3)} [LPF(i)*(R3'-i)^2] \tag{1}$$

whereby the lower interval boundary is UI and the upper interval boundary OI, and the quadratic (quantization) error is expressed by the term $(R3'-i)^2$. Furthermore, the value R3' takes values between the lower and the upper interval boundary UI, OI. If only discrete values are used, then in equation (1) a summation is made from the integral.

Subsequently, the mean quantization errors MQF are analyzed depending on value R3', see e.g. the right graph of FIG. 9, and that value R3' for the third reconstruction value R3* is chosen which gives the smallest mean quantization error MQF. This is expressed mathematically as:

$$R3* = \min[MQF(R3')] \tag{2}$$

Alongside this mode of operation there are further alternatives for calculating the smallest mean quantization error MQF known to those skilled in the art, such as calculating the quantization error with a norm formula |R3'−i| instead of the mean quadratic quantization error $(R3'-i)^2$.

Instead of using a relative frequency LPF calculated by measurement of the uncoded data values X0, a predetermined statistic can also be used. A good approximation for a relative frequency LPF for uncoded data values X0 is generated by the use of a Laplace distribution. A Laplace function or Laplace distribution is known from the prior art to those skilled in the art. The mode of operation for calculating the smallest mean quantization error by adopting a Laplace function is analogous to the above embodiment.

Figure 10:
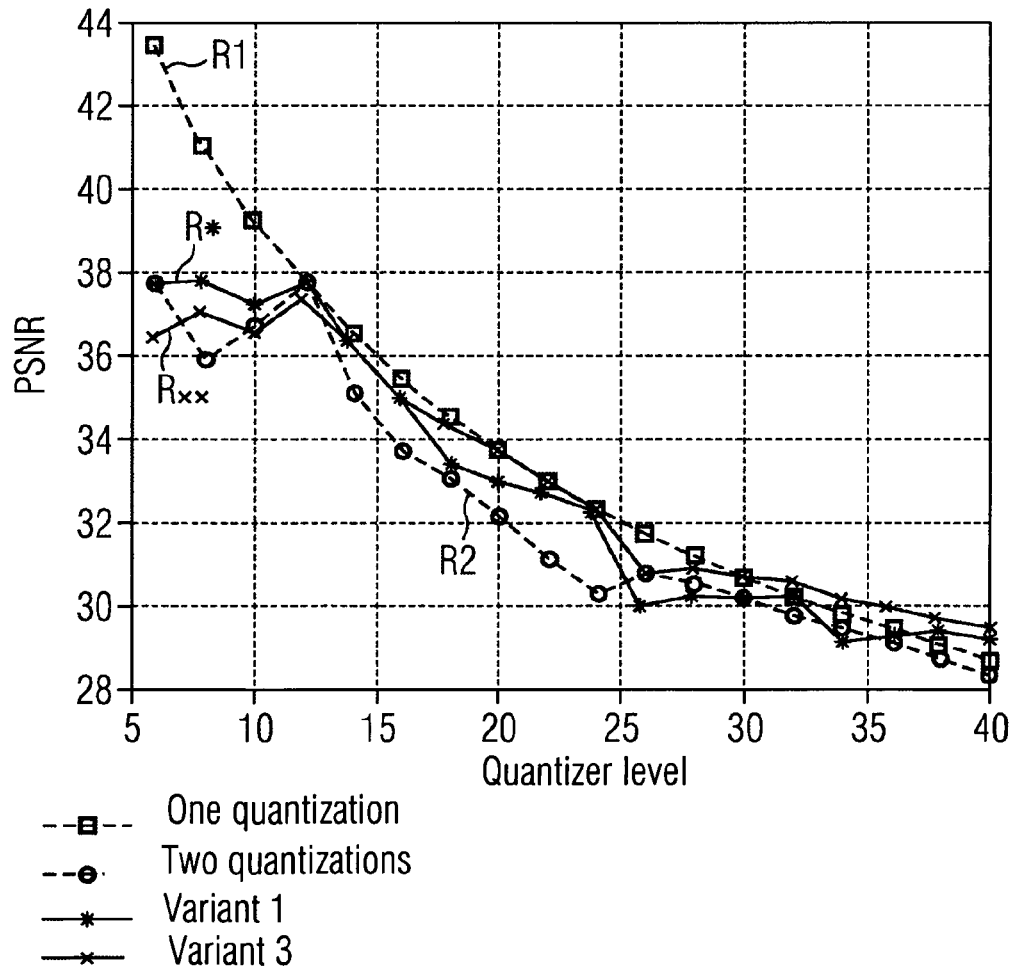
FIG. 10 is a graph for comparison of the image quality when using the method, taking into consideration the choice of the third reconstruction value by a relative frequency.

By the use of a relative frequency, the quantization error can be further reduced. Attention is drawn to this in FIG. 10, in which next to the first and the second reference curves R1, R2 and the curve R* according to variant 1 a further results curve Rxx is displayed which introduces the Laplace distribution as relative frequency (variant 3). Variant 3 is related to the introduction of the method in the transcoder TR and the second decoder D2. As can be taken from FIG. 10, through the introduction of the relative frequency to determine the third reconstruction value R3* a raising of the PSNR and hence an improvement of the image quality, or rather a reduction of the quantization error, is achieved. With the aid of the fourth mean M4, extensions to the method, such as the use of the relative frequency for calculating the third reconstruction value R3*, can be implemented and carried out.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3; d 870, 69 USPQ2d 1865 (Fed. Cir. 2004).

The invention claimed is:

1. A method to correct a quantized data value generated by a first quantization of an input data value, followed by a first inverse quantization and subsequently by a second quantization, where the first quantization has first quantization intervals and first reconstruction values and the second quantization has second quantization intervals, second reconstruction values and a second inverse quantization, comprising:
   generating, using a processor, third quantization intervals by shifting interval boundaries of each of the second quantization intervals to nearest-located interval boundaries of the first quantization intervals;
   establishing a third reconstruction value for and within each of the third quantization intervals;
   generating, a corrected data value by a third inverse quantization of the quantized data value, based on the third quantization intervals and each third reconstruction value associated therewith; and
   transcoding a digital signal using the corrected data value.

2. The method as claimed in claim 1, wherein said generating of the third reconstruction value for a respective third quantization interval uses at least one first reconstruction value of at least one corresponding first quantization interval located within the respective third quantization interval.

3. The method as claimed in claim 2, wherein said generating of the third reconstruction value uses a weighted mean value from two neighboring first reconstruction values.

4. The method as claimed in claim 3, wherein said generating of the third reconstruction value produces the third reconstruction value in the middle of the respective third quantization interval.

5. The method as claimed in claim 4, wherein said generating of the third reconstruction value is based on a relative frequency distribution of data values according to the first inverse quantization, and reassigns a common data value appearing most frequently to the third reconstruction value.

6. The method as claimed in claim 5, wherein said generating of the third reconstruction value includes allocating to the third reconstruction value, a low-error data value within the third quantization interval which on average produces a lowest quantization error when considering the relative frequency distribution of the data values.

7. The method as claimed in claim 6, wherein said generating of the corrected data value includes
   generating an intermediate value by the second inverse quantization of the quantized data value, and
   replacing the intermediate value by the third reconstruction value in the respective third quantization interval in which the intermediate value is located.

8. The method as claimed in claim 7, wherein said method is applied in an image decoding method to remaining quantized data values which are not considered for processing of other quantized data values.

9. The method as claimed in claim 7, wherein said method is applied in an image decoding method only to remaining quantized data values that remain unconsidered after processing of other quantized data values.

10. The method as claimed in claim 7, wherein said method is applied in a transcoder having a first decoder and a second coder and said correcting of the quantized data value occurs in a feedback loop of the second coder.

11. A device to correct a quantized data value generated by a first quantization of an input data value, followed by a first inverse quantization and subsequently by a second quantization, where the first quantization has first quantization intervals and first reconstruction values and the second quantization has second quantization intervals, second reconstruction values and a second inverse quantization, comprising:
   a processor configured to execute one or more operations including:
      generating third quantization intervals, by shifting interval boundaries of each of the second quantization intervals to the nearest-located interval boundaries of the first quantization intervals,
      establishing a third reconstruction value for and within each of the third quantization intervals, and
      generating a corrected data value by a third inverse quantization of the quantized data value, based on the third quantization intervals and each third reconstruction value associated therewith; and
   a transcoding unit performing transcoding using data from the processor.

12. The device as claimed in claim 11, wherein the one or more operations includes:
   generating an intermediate value by the second inverse quantization of the quantized data value, and
   replacing the intermediate value by the third reconstruction value in the respective third quantization interval in which the intermediate value is located.

* * * * *